Sept. 3, 1968  L. H. LEE  3,400,377
CHARACTER DISPLAY SYSTEM
Filed Oct. 13, 1965  3 Sheets-Sheet 1

INVENTOR.
LYLE H. LEE

BY Arthur Decker
ATTORNEY

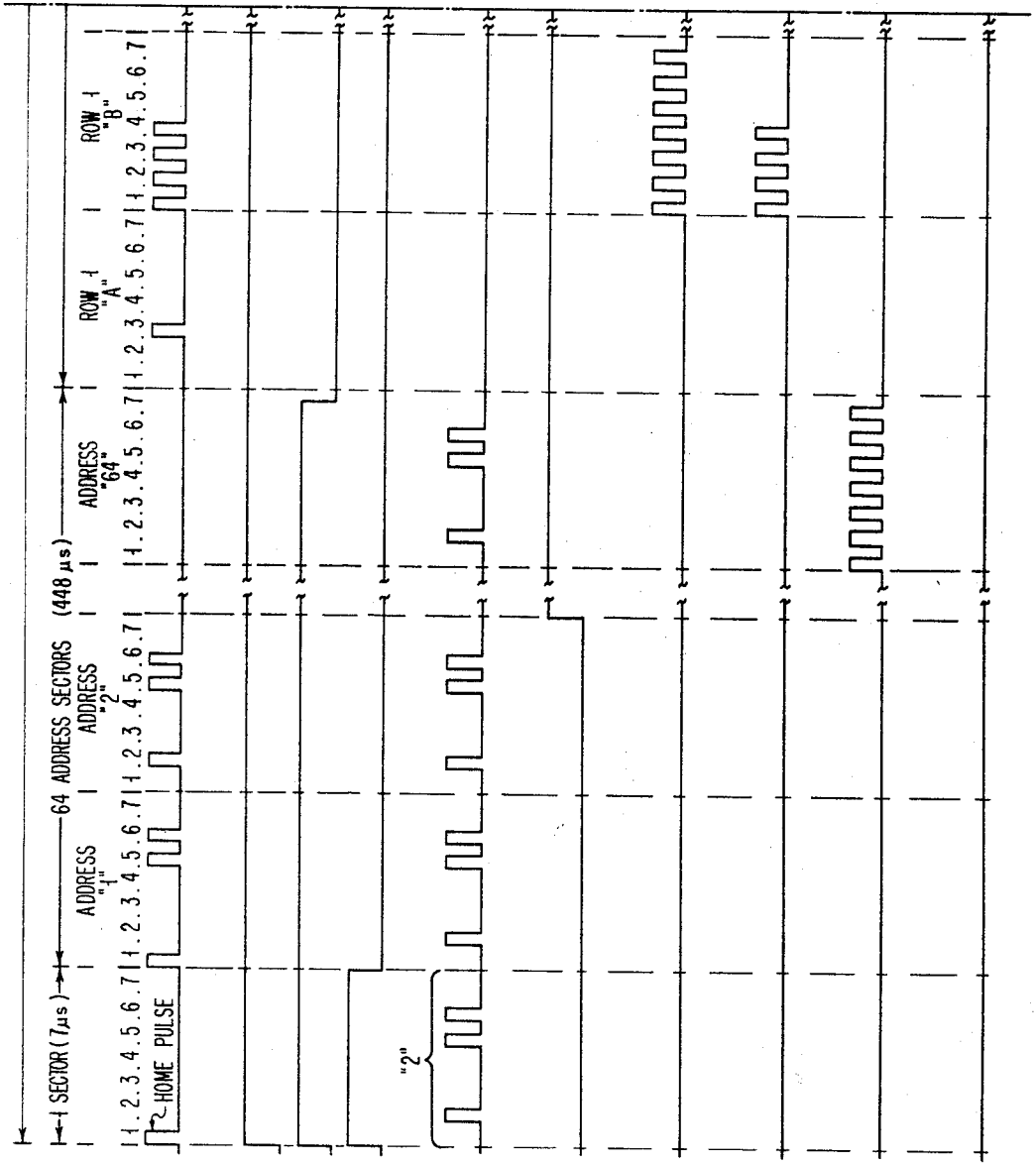

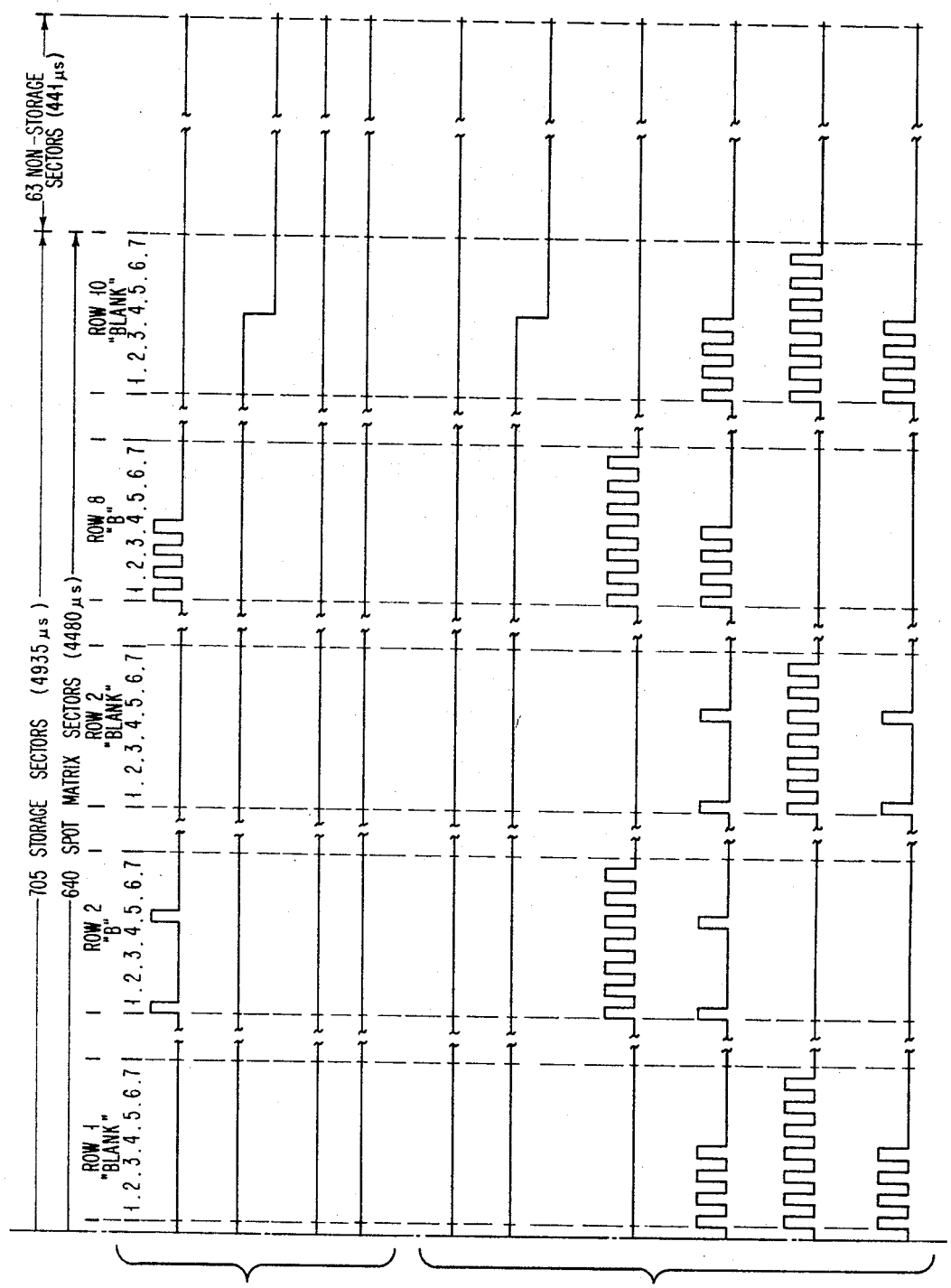

3,400,377
CHARACTER DISPLAY SYSTEM
Lyle H. Lee, San Jose, Calif., assignor to International Business Machines Corporation, Armonk, N.Y., a corporation of New York
Filed Oct. 13, 1965, Ser. No. 495,612
7 Claims. (Cl. 340—172.5)

ABSTRACT OF THE DISCLOSURE

A system for displaying characters including a storage means for storing sets of information corresponding to elemental areas of the characters and means for selecting and displaying the sets of information along scan lines such that the characters are recreated for display.

---

Figure 1:
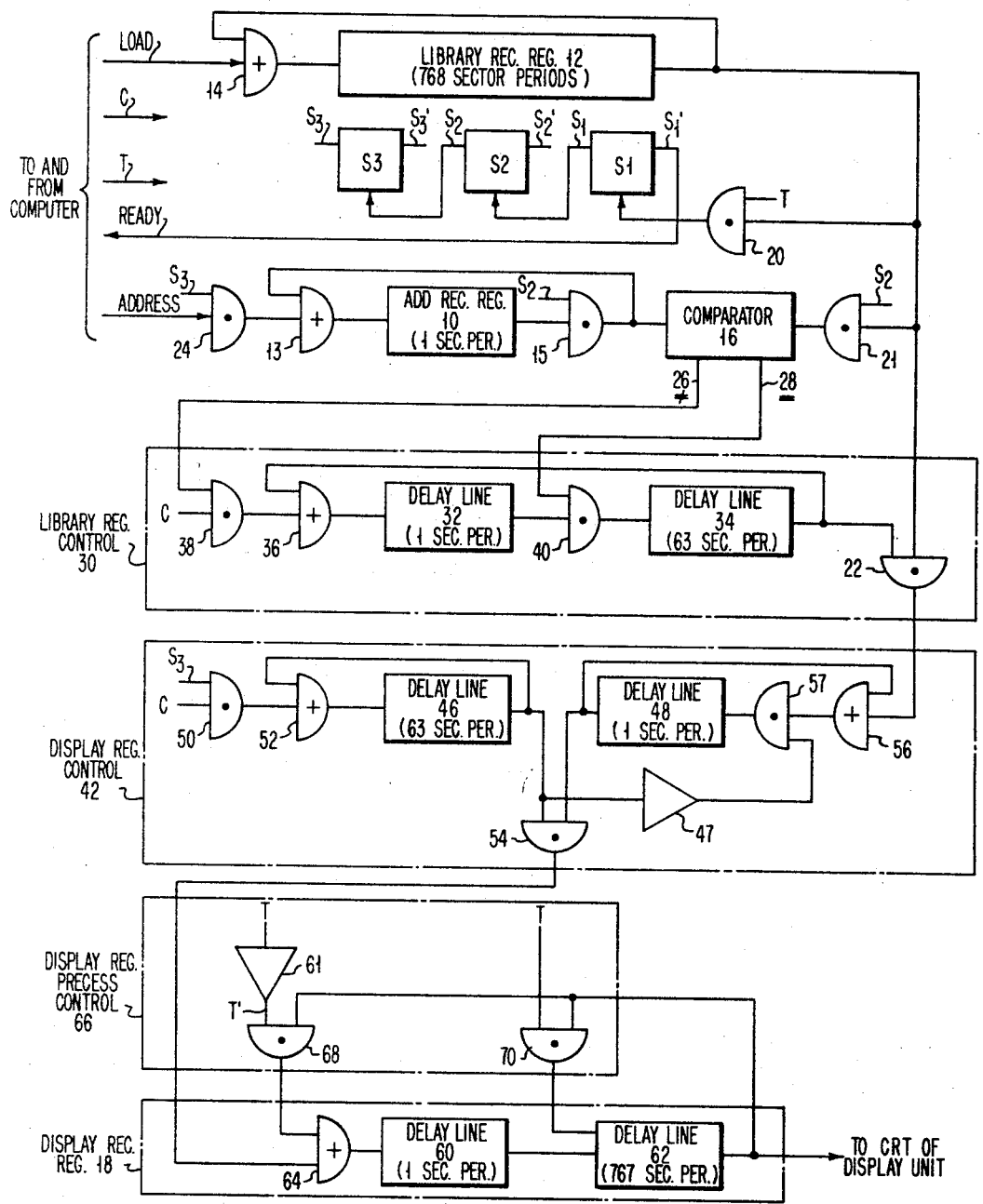

This invention relates to data display apparatus and, more particularly, to equipment for signal excitation of a display device, such as a cathode ray tube, for legible presentation of characters stored in digital form or for meaningful indication of information of any type.

A digital data display system receives digitally encoded information from, for instance, a computer, and provides a presentation thereof, preferably in human readable form, on a screen, such as the target of a cathode ray tube, in orderly fashion. The display may operate directly from the computer memory, or from an intermediate buffer, or through an analog-to-digital converter or from some other appropriate digital source. In a general way, display of selected characters under computer control is accomplished by simultaneously varying the horizontal and vertical beam deflection (sweep) signals to the cathode ray tube in synchronism with control of the beam intensity according to the character configuration; the former are usually currents or voltages for the tube deflection mechanism, whereas the latter is usually a potential, at the tube cathode and/or grid. In the case of a display of a plurality of horizontal lines of alphanumeric characters, the characters may be formed as a sequence of discrete intensified elemental areas (spots) in positions defined by the vertical and horizontal sweep voltages. Thus, in a system in which the characters in one of several lines are completely formed in sequence, the deflection voltages may define a character matrix scanning raster consisting of seven columns and ten rows for example, thereby requiring, for a display, three or more separate sweep generators. It can be appreciated that such co-operative sweeping involves problems of synchronizing, driving power and complexity of equipment.

To a considerable extent, these problems are avoided by the present invention, which operates to excite the cathode ray tube so that each horizontal sweep is completely across the tube face, thereby displaying, in co-ordination with the appropriate blanking pulses, one-tenth of all characters in the line of display. Thus, only one horizontal sweep, accompanied by one vertical sweep, suffices for the presentation of all characters in the line. As a result, a display using the system of this invention requires one-third less than the number of sweep generators required by a display in the prior system.

Briefly, the embodiment of this invention to be described uses recirculating storage for pulses representing the characters, and binary coded decimal addresses corresponding to the characters are similarly stored. The storage is preferably in the form of synchronized magnetostrictive delay lines which cycle repetitively and which are provided with means for input and output. Storage in the delay line which feeds the cathode ray tube display is in character interleaved form, i.e. the code for the top row of the spot matrix for a character is followed by the code for the top row of the succeeding character, and the codes for all top rows are followed by the codes for the next lower rows, etc.; the codes for the bottom (tenth) rows of all matrices completes the fill of the delay line. As a result of this arrangement, during a first horizontal beam sweep, the top tenth of each character is made visible, the second sweep intensifies the next lower tenth, etc., the persistence of the screen providing legibility of complete characters.

The present invention is concerned with this delay line and the equipment which provides the above configuration of data in this delay line, and has, for its primary object, assembly of signals for their presentation in legible form by a display device utilizing the character-representing signals generated, for instance, by a digital computer.

Another object of the invention is to accomplish the foregoing at speeds commensurate with that of inertialess indicators such as an oscilloscope and with computer operation so that the latter does not require undue idling to accommodate its output equipment.

A further object of this invention is to provide apparatus which generates a character display from a corresponding coded signal, and which also is characterized by flexibility in character representation.

Still another object of the invention is to provide a code converter, specifically from that comprising computer output language to that comprising a display input language.

The foregoing and other objects, features and advantages of the invention will be apparent from the following more particular description of a preferred embodiment of the invention, as illustrated in the accompanying drawings.

Figure 2:
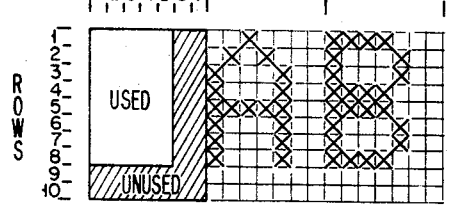

FIGURE 1 is a block diagram of the preferred embodiment of the invention;
FIGURE 2 shows the character spot matrix and exemplifies with the patterns for the letters A and B;
FIGURES 3 and 3b show the arrangement for storage in the library recirculating register and the activity of single shots S1, S2 and S3 in response to the home pulse therein; and
FIGURES 3a and 3c show the activity of the other equipment of FIGURE 1 for the handling of computer signals corresponding to the display of the letter B.

Referring now to FIGURE 1, a block diagram of the invention in a preferred form, it is seen that the system is associated, for purposes of control, with a computer. The control comprises: clock pulses, C, which may be provided in the computer by a continuously operating square wave generator, sensing a repetitive recording on a moving magnetic tape, disk or drum, or some other cyclic device well known in this technology; a series of 7-bit coded addresses on the "address" line, each representing a different alphanumeric character of a 63 character set sequentially entered into address recirculating register 10; on the "load" line, up to 63 sets of pulses, each set representing the sequence of spots which comprises the matrix of one of the alphanumeric characters to be considered, i.e., a library (memory) stored in library recirculating register 12 in positions identified by coded addresses also stored in this register; and, a "translate" signal, T, to indicate the setting up of a new address on the address line. In addition, a signal from the circuit, on the "ready" line, indicates to the computer that a character conversion has been completed and another character address may be set up on the "address" line.

Storage in library register 12 and in display recirculating register 18 (to be discussed later) is interleaved; that is, sequential samples are not stored in sequentially sensed row positions of the register, but are separated by a number of other samples. This concept is evident from FIGURES 2 and 3, the former of which shows the character spot matrix and illustrates, with the configuration of the letters A and B, as would be produced by the intensification of the cathode ray tube beam. The matrix comprises seven columns and ten rows, 70 spot positions in all, in which only the five left-most columns and the eight top rows are used for the character. Thus, any character is represented by a maximum of 40 spots in the display, a two-column space being provided between characters in the same horizontal display line and a two-row space between adjacent horizontal lines.

As already pointed out, the circuit of FIGURE 1 provides video drive for the cathode ray tube beam such that a horizontal sweep of the beam across the tube face corresponds to a row of information contained in all characters of a line. Thus, row 4 of a line containing the letter A followed by the letter B, would require beam pulsing in the sequence 10001001111000 to occur at an appropriate interval after initiation of the row 4 horizontal sweep. This sequence, then, needs to be set up in display recirculating register 18 after accessing and readout of the codes corresponding to the letters A and B from library register 12.

As indicated in line diagram I of FIGURES 3 and 3b, library register 12, which has a recirculating interval (delay) of 5376 microseconds and stores, in accordance with the computer clock rate, one microsecond pulses (return-to-zero coding) is regarded as divided into 768 storage sectors, each containing seven bit positions. The first (left-most on the diagram and first to have its contents emitted) sector serves for timing energization of other components of the system and contains a "home" pulse marking the beginning of the register; library register 12 may thus be considered as the system standard of synchronization. The next 64 sectors of the register contain codings representing 64 different addresses: thus, address 1 is coded in the sequential pulse positions of the first of these sectors as 1000110, address 2 is coded as 0100110, etc., and address 64 is coded as 0000000. The next 640 sectors contain spot matrix pulses corresponding to character configurations in 10 interleaved sets of 64 with the exception that, for purposes to be explained, the last (64th) sector of each set is uncoded ("BLANK"). The remaining 63 sectors of register 12 are not used for storage; their delay interval allows for tolerances and aging of other system components and for flyback time of the CRT beam.

The first set of spot matrix sectors contains the codings for the top (first) row of the character matrices; thus, the first sector, corresponding to row 1 of the character "A" (FIGURE 2), contains a pulse in the third bit position only, the next sector, corresponding to row 1 of "B," contains pulses in the first, second, third and fourth bit, positions, the 64th sector, corresponding to a "BLANK," contains no pulses, the 66th sector, corresponding to row 2 of "B," contains pulses in the first and fifth bit positions, etc. As a result of this arrangement, it is apparent that correct sequential readout of a character matrix, after proper address accessing, requires identification of a delay of 64 sector periods (448 microseconds), as well as other timing constraints.

Returning now to FIGURE 1, library register 12 is connected at its output to AND gates 20, 21 and 22. The other input to gate 20 comprises signal T which, as will become apparent, is set at a high potential only during the non-storage period of register 12. The output of gate 20 is connected to the input of single-shot S1, an output of single-shot S1 is connected to the input of single-shot S2 and an output of the latter, in turn, is connected to the input of single-shot S3. Thus, as shown in the corresponding line diagrams II, III and IV of FIGURE 3, presuming that all three single-shots are in their stable states (outputs $S_1$, $S_2$ and $S_3$ are low in potential and outputs $S_1'$, $S_2'$ and $S_3'$ are high in potential) a coincidence of signal T and the home pulse of register 12 triggers single-shot S1 to its unstable state (output $S_1$ becomes high in potential and output $S_1'$ becomes low in potential), output $S_1$ similarly triggers single-shot S2 and output $S_2$ triggers single-shot S3. The single-shot time constants are such that, single-shot S1 reverts to its stable state during the last sector period (row 10 of the "BLANK" character) of the storage portion of register 12, single-shot S2 reverts (output $S_2$ becomes low and output $S_2'$ becomes high) during the sector period of the 64th address and single-shot S3 reverts (output $S_3$ becomes low and output $S_3'$ becomes high) at the end of the first sector period.

The output of library register 12 is also fed to OR gate 14, the other input of which comprises the "load" output line from the computer; thus, the library of spot matrices, in pulse form, may be entered into register 12 and recirculated thereby.

Gate 21 passes the content of register 12 when output $S_2$ of single-shot S2 is high, namely during the first 65 sector periods. Thus, the address codes only of register 12 are serially sensed by comparator 16. During the first sector period, output $S_3$ of single-shot S3 is high, energizing AND gate 24, thereby entering the next address of a character to be displayed from the "address" line through "OR" gate 13 into address register 10, where it is recirculated once each sector period; this address had previously been set up in the computer output register (not shown) on receipt of the system "ready" signal, comprising a high potential of output $S_1'$ of single-shot S1 during the last sector period. This sought address is available continuously to comparator 16 during the address sectors and is eliminated at the start of the spot matrix sectors when output $S_2$ falls and "AND" gate 15 closes. Each sector period during the address section of register 12, comparator 16 thus operates to tally the sequential addresses received from register 12 against the address stored in register 10.

The signal on line 26 is high and that on line 28 is low as long as the two addresses to comparator 16 are unequal, but, if they are equal, a high potential occurs on line 28 instead, until the last spot matrix sector period (see FIGURE 3a, line diagrams V and VI).

Lines 26 and 28 feed into library register control circuit 30 which comprises a pair of delay lines 32 and 34, the former of 7 bits capacity (1 sector period delay) and the latter of 441 bits capacity (63 sector period delay). Delay line 32 receives alternate inputs via OR gate 36: one input is a continuous stream of clock pulses through AND gate 38 when line 26 is high; these pulses are lost (not recirculated) except when line 28 goes high, in which case the set of seven pulses in delay line 32 is entered through AND gate 40 into delay line 34 and recirculates with a delay of 448 bit periods (delay lines 32 and 34 are connected as one larger delay line). As a result of this operation, when the character address received from the computer is accessed in library register 12, a series of seven pulses energizes AND gate 22 at 64 sector period intervals; readout from library register 12 thus occurs during the sector periods in which the sought character spot matrix pulses are available at its output.

This activity is exemplified in FIGURE 4, which presents line diagrams representing the accessing of the character "B" entered into address register 10 by the computer as address "2"; line diagram V of the figure shows the corresponding code recirculating every seven microseconds (sector period) throughout the address sector interval of library register 12. (The code had previously been entered into address register 10 through gate 24 during the first sector period when the output $S_3$ of single-shot S3 was high.) During the second sector period, address "1" from library register 12 is compared with the sought address "2" by comparator 16 and the inequality, through line 26, causes a sequence of seven clock pulses to enter delay line 32, but the lack of equality during the first sector period, through line 28 (line diagram VI of FIGURE 3a), prevents a previous set of clock pulses from passing into delay line 34 through gate 40. During the third sector period, comparator 16 tallies an equality; line 26 closes gate 38 and line 28 (line diagram VI) opens gate 40. As a result, seven clock pulses recirculate in delay lines 32 and 34 and are available each 64th sector period (line diagram VII) coincident with the sector periods of library register 12 (FIGURE 3, line diagram I) for which the spot matrices of the letter "B" are available. Consequently, character "B" spot matrices only and in proper sequence from row 1 through row 10 of the character matrix (FIGURE 2) are passed through gate 22.

It has been mentioned that storage in display recirclating register 18 is interleaved; in particular, this register is, like library register 12, 768 sector periods long and normally would receive up to 640 selected row spot matrices transferred from library register 12, as described above. The spot matrices correspond to 64 characters to be displayed in a line on the cathode ray tube and the row spot matrices of a character are separated in display register 18 by 63 other row spot matrices. Control for filling display register 18 is provided by display register control circuit 42, which includes a pair of delay lines 46 and 48, the former of 63 sector periods delay and the latter of one sector period delay.

The row spot matrices for the accessed characters are passed through gates 56 and 57, where they are each recirculated in delay line 48, once each sector period, for 63 sector periods (i.e., until replaced by the next row spot matrix). Line drawing VIII of FIGURE 3A illustrates the content of delay line 48 after accessing of the letter "B" code.

In order to line up the spot matrices in display register 18 properly, entry into this register is made only during the sector periods designated as "BLANK" in FIGURE 3b. Thus, the readout from delay line 48, made via gate 54, requires energization of this gate only for the "BLANK" sector periods. This timing is provided by entering into delay line 46 a series of seven clock pulses during the first sector period of recirculation of library register 12 (output $S_3$ of single-shot S3 opens gate 50) and also connecting delay line 46 for recirculation through gate 52. This activity is shown by the line drawing IX of FIGURE 3a. To avoid a confusion of inputs to delay line 48, the output of delay line 46 is utilized after inversion by inverter 47, to close AND gate 57, thereby blocking recirculation in delay line 48 and eliminating a prior content. In summary, AND gate 54 passes the line spot matrices for a character in sequence but separated by 63 sector period intervals.

Display register 18 actually comprises a pair of serially connected delay lines 60 (one sector period delay) and 62 (767 sector period delay), entry into the former of which is made from gate 54 through OR gate 64 and output from the latter of which is fed to the display unit cathode ray tube. Associated with display register 18 is display register precess control circuit 66, which provides proper sequential arrangement of the sequence of up to 64 character spot matrices in delay lines 60 and 62. This is accomplished through AND gates 68 and 70. Gate 68 arranges for a 64 sector period delay in display register 18 and is kept open by a recirculation signal, T', generated by inverter 61 from "translate" signal, T, received from the computer and present when no entry is to be made. However, when a new character code is to be entered, precession of display register 18 is provided by utilizing signal, T, directly to open gate 70, thereby reducing the delay by one sector period for one recirculation. Thus, with regard to library register 12, a next set of ten sectors in display register 18 is made to await the entry of the next character accessed. Line drawing X of FIGURE 3a presents some of this activity in display register 18, showing the sequential row spot matrices for the character "B" separated by 63 sector period intervals just before precession of register 18 with regard to register 12.

While the invention has been particularly shown and described with reference to preferred embodiments thereof, it will be understood by those skilled in the art that the foregoing and other changes in the form and details may be made therein without departing from the spirit and scope of the invention.

What is claimed is:
1. A system to control a CRT or the like for displaying characters by the cyclic scanning of a modulated writing means, said system comprising,
   an information unit storage means for storing characters divided into sets of information digits corresponding to elemental areas of the characters,
   means for signaling the sequence in which said characters are to be displayed,
   means for assembling said digit sets from said storage means in an interleaved format responsive to the signaling means, and
   means for modulating said writing means during scanning responsive to the assembled digit sets for forming said elemental areas of a character in registration with one another for displaying said characters in a sequence determined by said signaling means.
2. The system of claim 1 wherein said storage means and said assemble means comprise recirculating registers such as delay lines or the like operating in synchronism.
3. The system of claim 1 and
   means to precess said assemble means so that information digits sets stored therein are recirculated in the sequence as entered by said storage means.
4. In a system for displaying characters on a CRT or the like:
   a cyclic store for storing codes representing all characters which may be displayed accompanied by codes representing their addresses;
   a first register to store the address code of a particular character to be displayed;
   a comparator connected to said register and said cyclic store;
   means to select only address codes from said cyclic store for transmission to said comparator;
   a gate connected to said comparator and responsive to an equality of address codes on the inputs to gate out from said cyclic store the code for the particular character to be displayed;
   a second register responsive to said gate to temporarily store the code of the selected character;
   storage means responsive to said second register to store a plurality of characters to be displayed;
   a timer to control said cyclic store, first and second registers, comparator, selecting means, and gate to set up said storage means with a plurality of characters to be displayed in sequence.
5. The system of claim 4, in which
   storage in said cyclic store is in the form of sectionalized coding, the codes for the corresponding section of all characters being recorded sequentially;
   said gate is synchronized with said cyclic store so as to open cyclically in accordance with the separation between the sectional codes of a character;
   said second register provides cyclic storage of the code for one character section;
   storage in said storage means is in the same form as in said cyclic store.
6. In a system for displaying on an indicator characters identified by addresses received in sequence from a computer:
   a first delay line having address sectors for storing coded addresses and storage sectors for storing coded characters in sets, the address and the coded sets for its character being separated by a prescribed number of sectors;

a comparator having an equality output;

a register responsive to the computer to store, one at a time, the address codes of particular characters to be displayed;

a gate operative to connect said first delay line to said comparator only during the address sectors of said first delay line;

a second delay line;

a control circuit responsive to the equality signal of said comparator to connect said first delay line to said second delay line at intervals corresponding to the number of sectors separation between sets of a character in said first delay line; and means to precess said second delay line by one sector for each address received by said register.

7. The system of claim 6 in which the sectors separating between an address and the coded sets for its character store the address and the coded sets for all other characters in said first delay line.

References Cited

UNITED STATES PATENTS

| | | | |
|---|---|---|---|
| 2,978,680 | 4/1961 | Schulte | 340—172.5 |
| 3,235,849 | 2/1966 | Klein | 340—172.5 |
| 3,274,557 | 9/1966 | Prager | 340—172.5 |
| 3,307,156 | 2/1967 | Durr | 340—172.5 |

PAUL J. HENON, *Primary Examiner.*

R. B. ZACHE, *Assistant Examiner.*